Jan. 13, 1931.  P. J. SHAMPAY  1,789,086

CARPET DUSTING APPARATUS

Filed Aug. 15, 1924  6 Sheets-Sheet 1

Inventor
Pascal J. Shampay
By Nim & Crane
Attys.

Jan. 13, 1931.  P. J. SHAMPAY  1,789,086
CARPET DUSTING APPARATUS
Filed Aug. 15, 1924  6 Sheets-Sheet 4

Inventor
Pascal J. Shampay
By Nissen & Crane
Attys.

Jan. 13, 1931.   P. J. SHAMPAY   1,789,086
CARPET DUSTING APPARATUS
Filed Aug. 15, 1924   6 Sheets-Sheet 6

Inventor
Pascal J. Shampay
By Nissen & Crane
attys.

Patented Jan. 13, 1931

1,789,086

UNITED STATES PATENT OFFICE

PASCAL J. SHAMPAY, OF INDIANAPOLIS, INDIANA

CARPET-DUSTING APPARATUS

Application filed August 15, 1924. Serial No. 732,257.

This invention relates to a machine for cleaning carpets, rugs, and other articles, and has for its object the provision of mechanism which shall thoroughly clean the article without applying water thereto.

The invention is exemplified in the combination and arrangement of parts shown in the accompanying drawings and described in the following specification, and it is more particularly pointed out in the appended claims.

In the drawings—

Figures 9, 10:
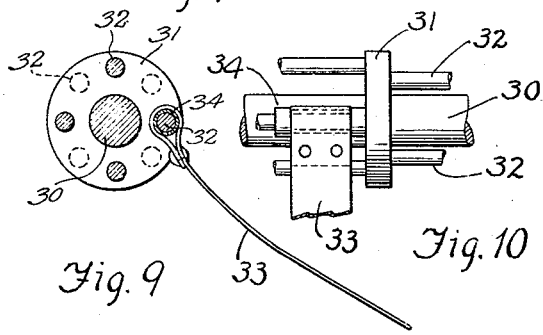
Figs. 9 and 10 are detail views of the drive shaft for the beaters.

The machine shown in the drawings comprises end frame members 15 and 16, the members being connected by angle bars 17, 18, 19, 20, 21, 22, 23, 24 and 25. Near the top of the frame and extending longitudinally thereof is a beating chamber 26 having a cover plate 27 provided with a hinged door 28. Extending longitudinally of the machine between the door and the cover 27 is a slot 29 for admitting air to the chamber 26. Also extending longitudinally of the machine within the chamber 26 is a beater shaft 30 provided with flanges 31 spaced longitudinally thereof. Bars 32 are supported between the flanges 31, the bars at each side of the flanges being offset circumferentially relative to the bars at the opposite side thereof, as shown in Figs. 9 and 10. The bars 32 carry beater straps 33 of flexible material, such as leather. These straps are held in spaced relation on the bars by means of spacing collars 34.

Figure 1:
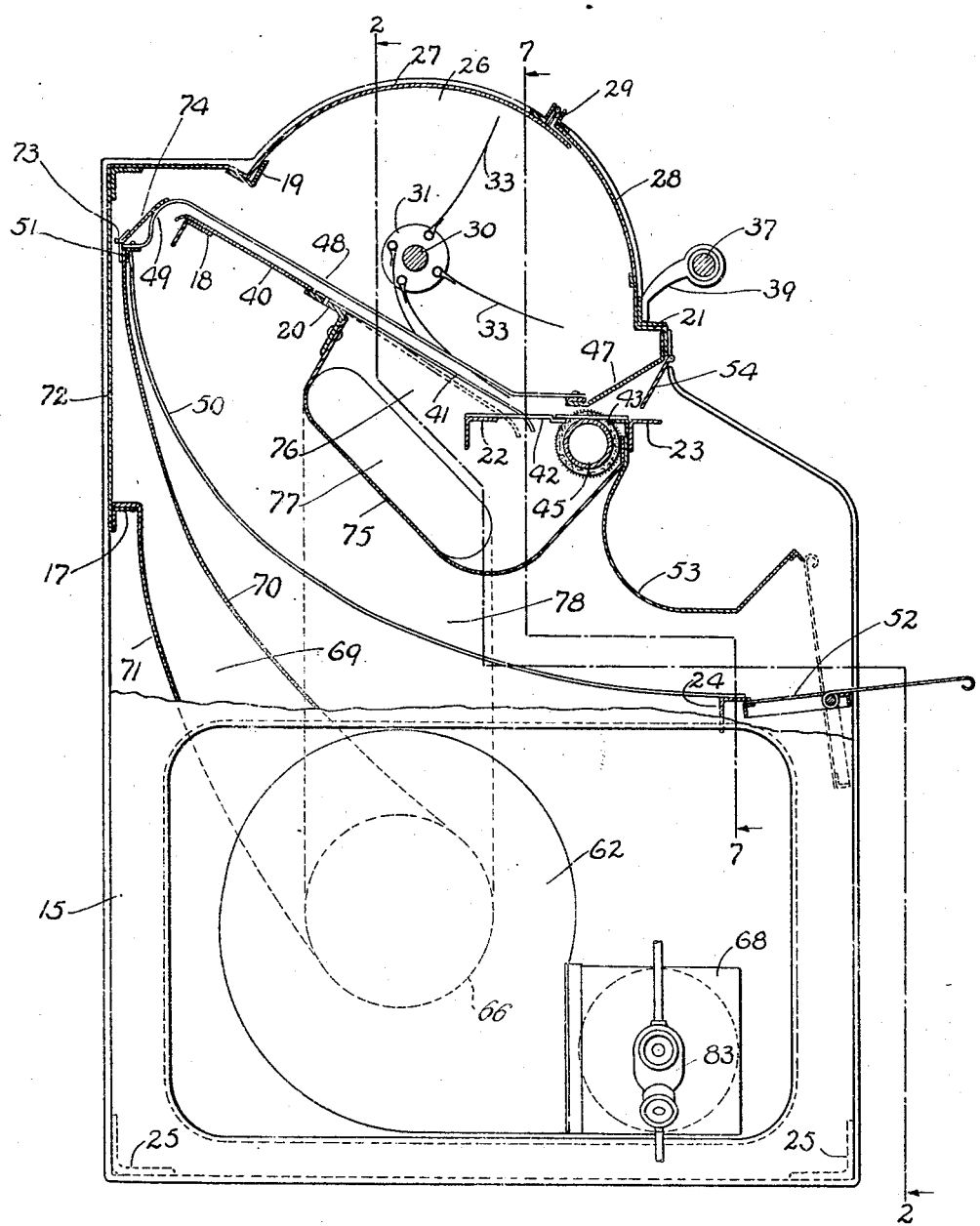
Fig. 1 is an end elevation, partly in section, showing one embodiment of the present invention.
Figure 2:
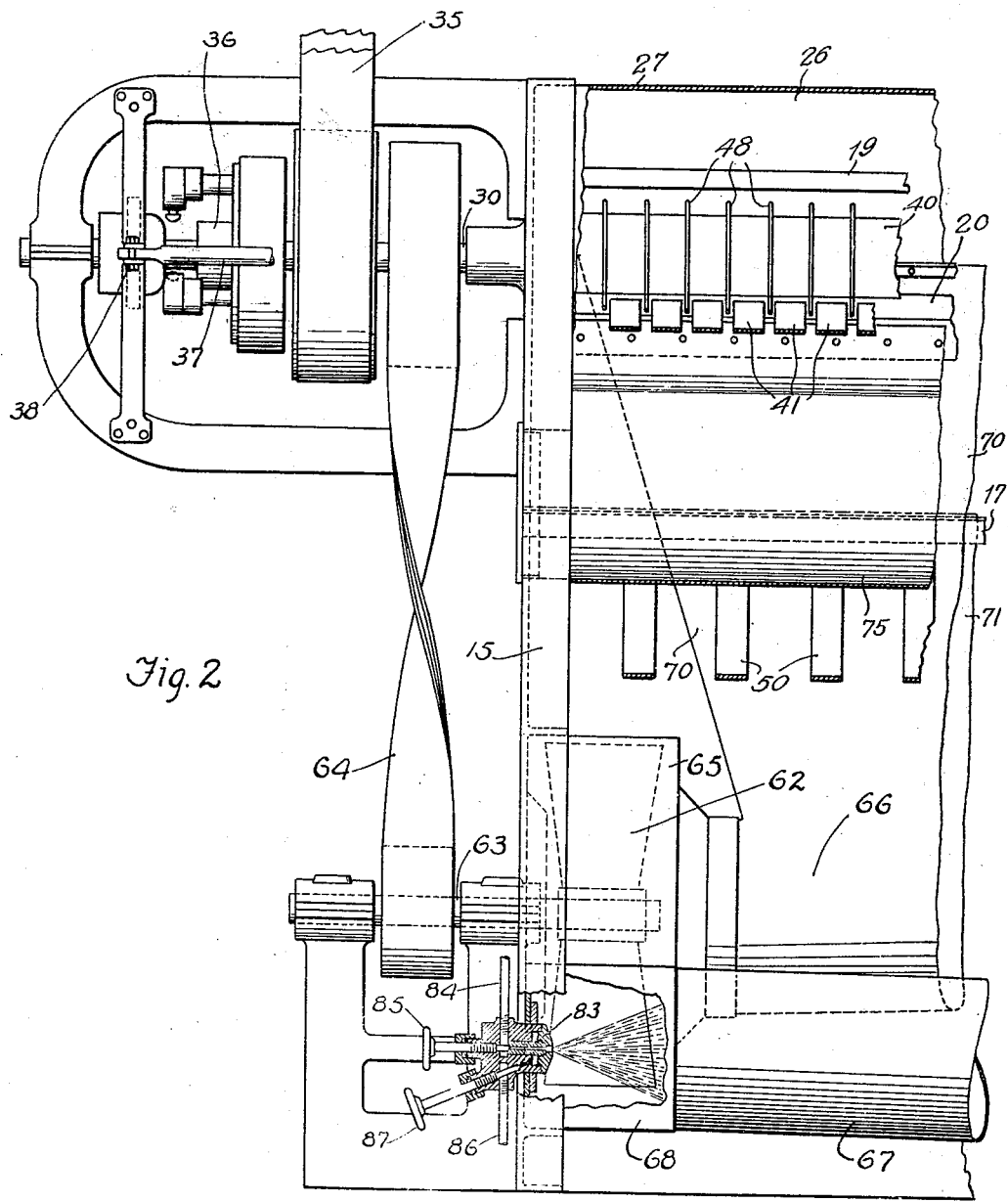
Fig. 2 is a fragmentary front elevation, partly in section, substantially on line 2—2 of Fig. 1.

The shaft 30 is driven by a belt 35 at one end of the machine, as shown in Fig. 2, the shaft being controlled by a clutch 36 operated by a hand bar 37 connected to the clutch by a lever 38. The bar 37 extends across the front of the machine and is supported in brackets 39 to slide longitudinally for throwing the machine into and out of operation. Below the shaft 30 in the path of the beaters 33 there is provided a floor for the chamber 26 which constitutes a supporting platform or guideway for the rug or carpet to be cleaned. This floor comprises a plate 40 supported on the angle bars 18 and 20 and a plurality of spring slats 41 projecting forwardly from the angle bar 20 and curved downwardly at the forward ends to extend between rods 42 supported by the angle bar 22 and connected at their forward ends to plates 43.

Figures 4, 5:
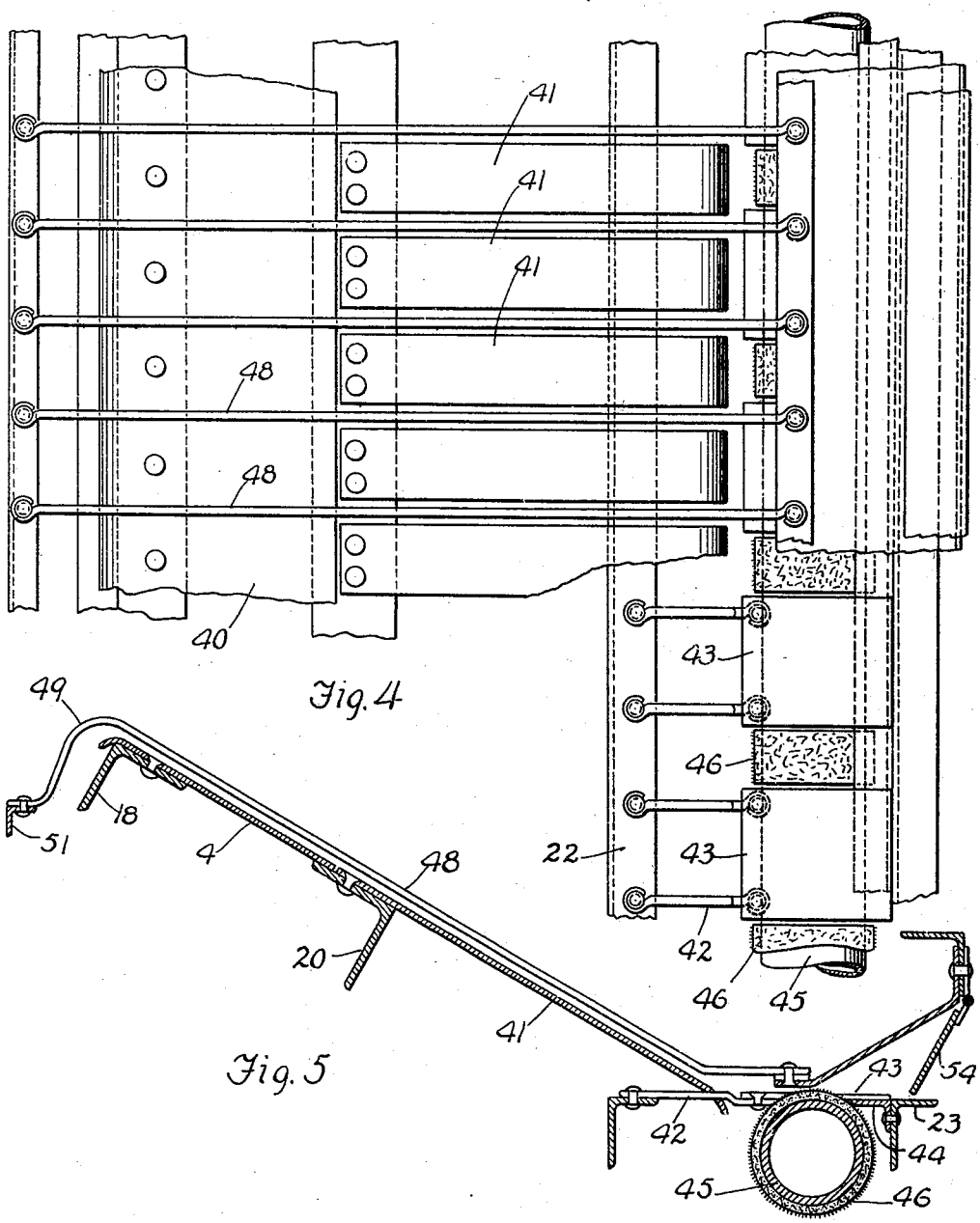
Fig. 4 is a fragmentary top plan view of the beating mechanism, the top of the casing being omitted.
Fig. 5 is a vertical section of the mechanism shown in Fig. 4.

As shown best in Figs. 4 and 5, the plates 43 are carried upon an angle bar 44 attached to the bar 23. The plates 43 are arranged in spaced relation longitudinally of the machine and are positioned above a feed roller 45. The roller 45 between the plates 43 is provided with a covering of frictional material 46 for feeding the article to be cleaned. This covering may be carding cloth having suitable pins projecting therefrom to enter the article to be fed.

Supported from the angle bar 21 is an inclined plate 47 for guiding the material to the feed roll 45 and a series of guide rods 48 extend rearwardly from the plate 47 in parallel spaced relation with the slats 41 and plate 40. At their rear ends the guide rods 48 are bent downwardly, as shown at 49, to direct the article being cleaned downwardly onto guide slats 50. These slats may be in the form of steel bands approximately two inches wide and four inches apart. The guide rods 48 and the slats 50 are supported at their rear ends by an angle bar 51 extending longitudinally of the machine. The slats 50 return the article after it has passed beneath the beaters to the front of the machine where it is received on a pivoted table 52.

A trough or support 53 is provided for supporting the article as it is fed into the machine. The article enters through the opening between the angle bar 23 and the plate 47 and is moved rearwardly by the feed roller 45 and by the action of the beaters as they strike the upper surface of the article. It will be seen that the beaters strike downwardly between the guide rods 48 and on top of the spring strips 41. If desired, as soon as the article has passed once through the machine it may be inverted and passed again beneath the beaters, the beaters striking the opposite side of the article. A hinged door 54 is preferably provided for closing the opening through which the article is fed to the machine.

Figure 6:
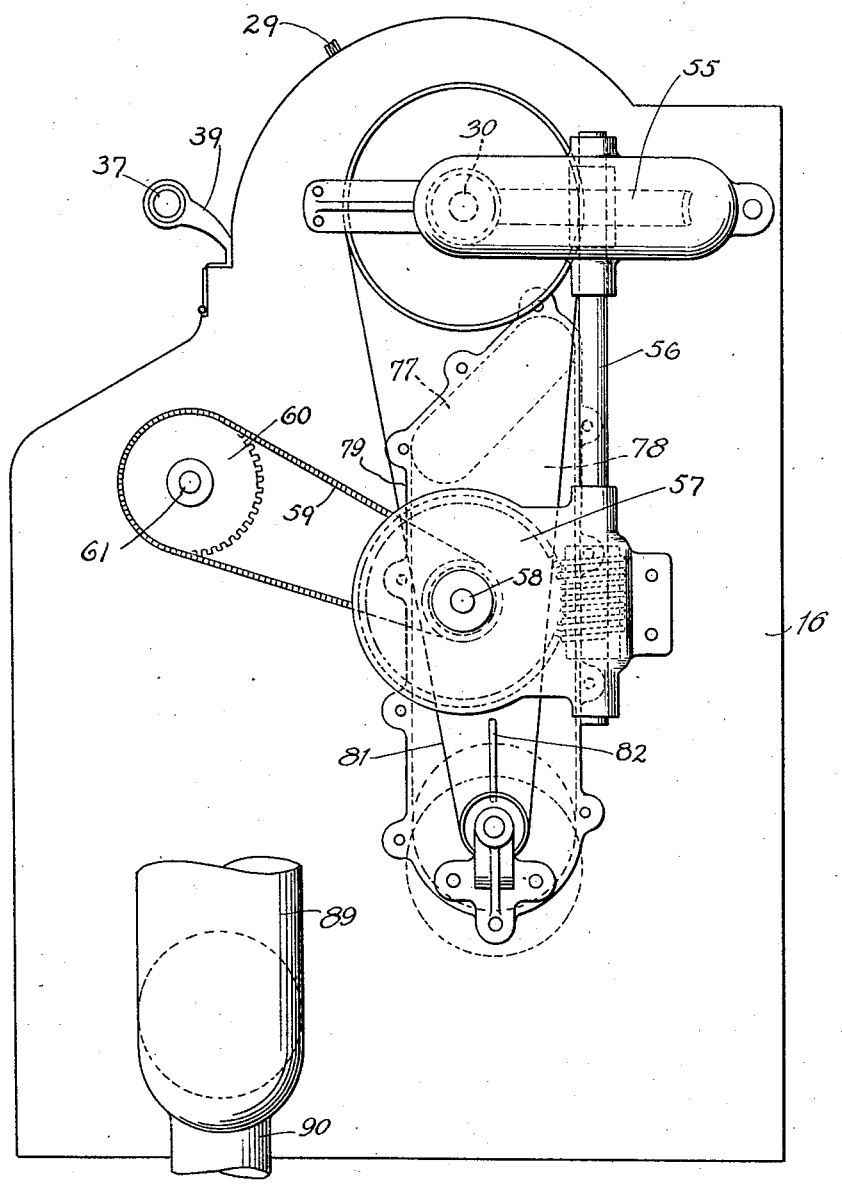
Fig. 6 is an end elevation at the opposite end from that shown in Fig. 1.
Figures 7, 8:
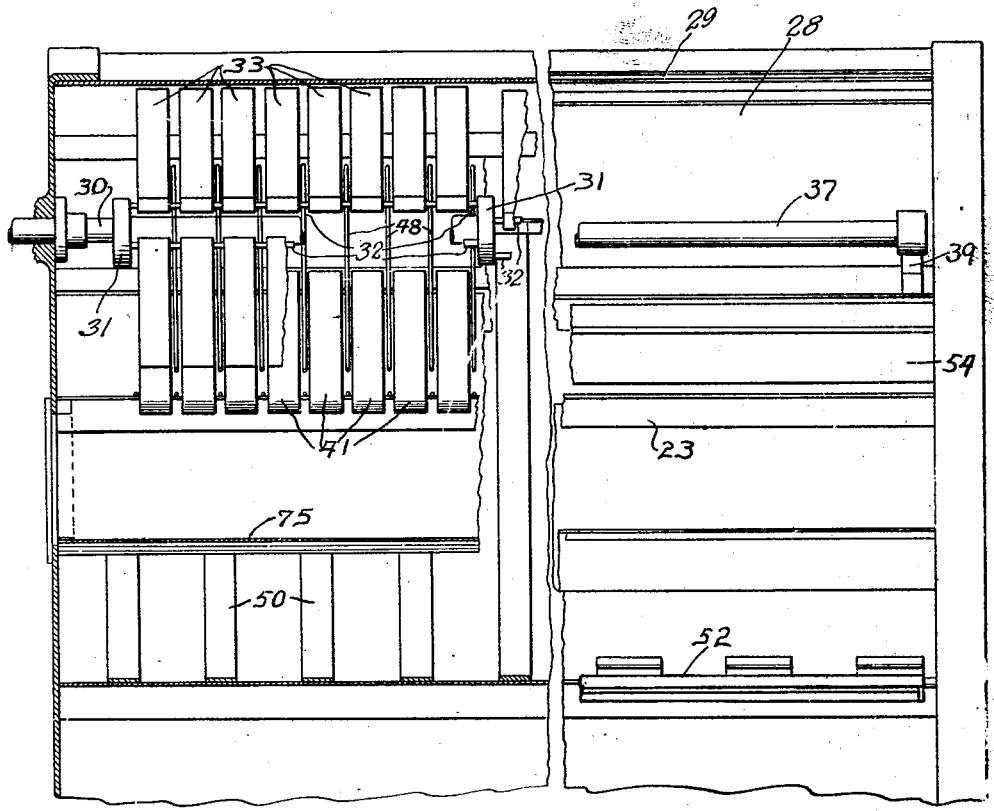
Fig. 7 is a fragmentary sectional view substantially on line 7—7 of Fig. 1.
Fig. 8 is a fragmentary front elevation of the opposite end of the device from that shown in Fig. 7.

The feed shaft 45 is driven from the shaft 30 by a reduction drive shown in Fig. 6. This drive includes a worm connection 55 operating a shaft 56 which in turn drives a worm gear 57 secured to a stud shaft 58. The stud shaft 58 is connected by a sprocket chain 59 to a sprocket wheel 60 secured to a shaft 61 which is journaled in the frame member 16 and connected with the feed shaft 45.

To remove the dust dislodged from the carpet by the beaters 33 a fan 62 is mounted on a shaft 63 and driven by a belt 64 from the beater shaft 30. The fan 62 is enclosed in a housing 65 having an intake pipe 66 connected to the side thereof and an outlet pipe 67 connected to a box 68 communicating with the periphery of the housing. The pipe 66 is open along its upper rear portion and communicates with a passageway 69 having a front wall 70 and a rear wall 71 which are continuous at their lower edges with the wall of the pipe 66. The upper edge of the wall 71 is secured to the angle bar 17 and the rear wall 72 of the machine casing forms a continuation of the wall 71 to provide a narrow throat 73 communicating with the beater chamber 26. A hinged door 74 may be provided for closing the throat when desired. It will be seen that rotation of the fan will draw air through the pipe 66, passageway 69 and throat 73 from the chamber 26 thus removing the dust from the upper side of the article being cleaned. A dust pan 75 is supported by the angle bars 20 and 23 to provide a chamber 76 beneath the spring slats 41. This chamber 76 communicates through an opening 77 with a passageway 78 leading to the end of the pipe 66 opposite the fan 62.

Figure 3:
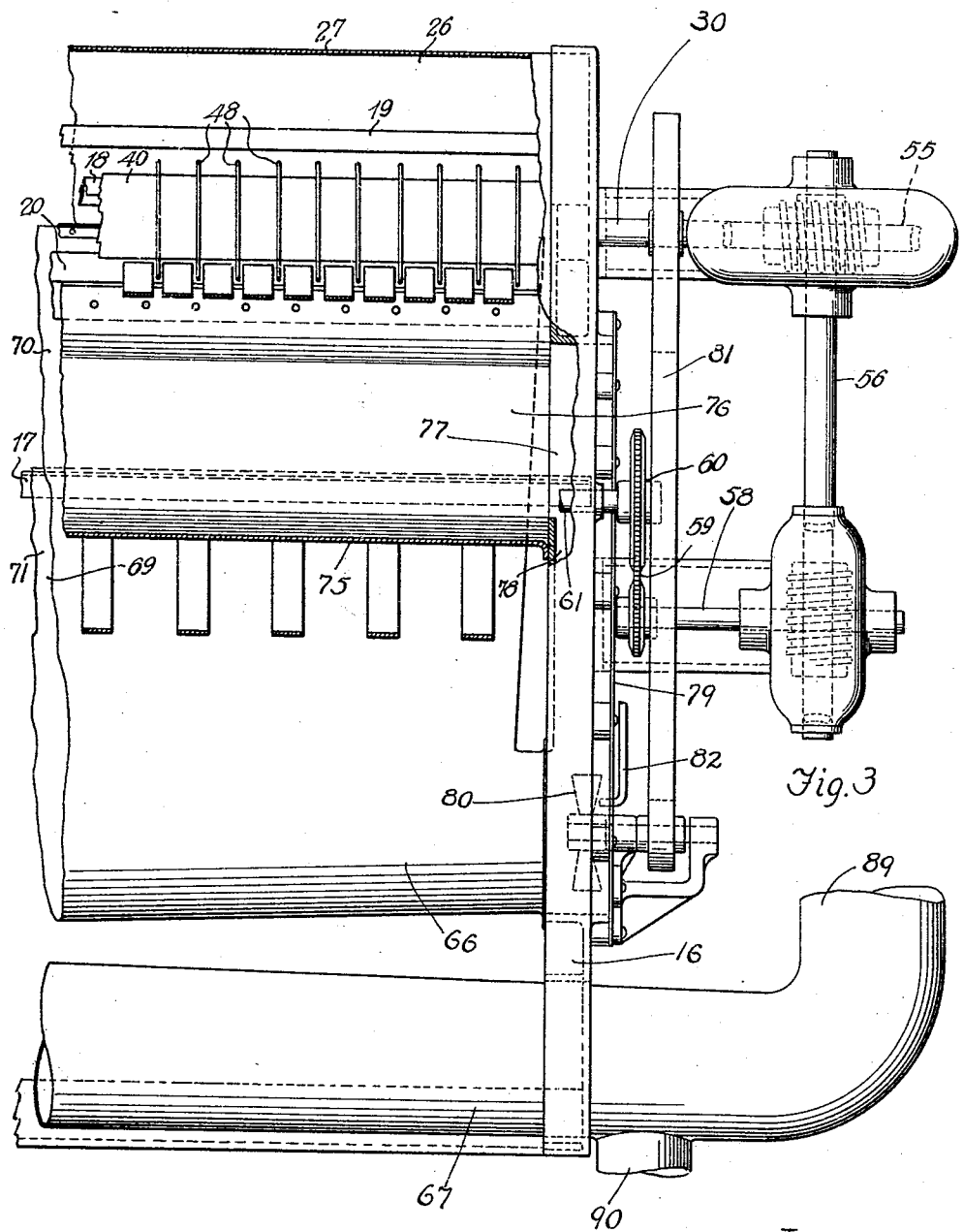
Fig. 3 is a view similar to Fig. 2, but showing the opposite end of the machine.

As shown in Figs. 3 and 6, the passageway 78 is formed by openings cast in the end frame 16 and closed on their outer sides by a cover plate 79. This arrangement provides a convenient means of assembling the parts and avoids the use of connecting pipe between the chamber 76 and the pipe 66. An auxiliary fan 80 is preferably provided in the end of the pipe 66 opposite the fan 62, as shown in Fig. 3. This fan is driven by a fan belt 81 operated from the beater shaft 30. A spray nozzle 82 discharges into the pipe 66 at the end thereof adjacent the fan 80 to lay the dust in the pipe 66. As shown in the drawings, the nozzle 82 is so located that the spray discharged therefrom impinges on the blades of the fan 80 and is discharged from the fan with the current of air set up thereby. This converts the spray into a fine mist or fog that substantially fills the entire pipe 66 and quenches the dust as it is drawn therein from the beaters. The fog and dust thus intermingled is drawn into the fan chamber 62 and discharged therefrom into the pipe 67. As it enters the pipe 67 it further encounters a spray discharge from a combined water and air or steam nozzle 83. This combined nozzle comprises a water inlet 84 controlled by a valve 85 and an air inlet 86 controlled by a valve 87. The dust is thus precipitated from the air and settles to the bottom of the pipe 67 where it is washed away by the water from the two spray nozzles. The pipe 67 preferably extends upwardly at 88 and may be continued through the roof of the building. A suitable connection 90 from the lower side of the pipe is provided extending to the sewer for carrying off the dust collected by the water sprayed into the pipe.

In operation, the carpet or other article is fed into the machine over the feed roller 45 and continues upwardly between the guides 48 and the spring strips 41. The dust and dirt is thoroughly beaten from the carpet between the beaters 33 and the spring strips 41, the operation of the beaters assisting the roller 45 in moving the carpet over the plate 49 where it is guided downwardly by the curved portions 49 of the guide rods 48 onto the receiving strips 50. During the beating operation the air is continuously exhausted both from the top and bottom side of the carpet so that all of the dust and dirt removed therefrom is withdrawn by the fans 62 and 80 and discharged into the pipe 67 where it is washed into the sewer by the sprays, as described. The use of the spray nozzles makes it possible to free the air from dust so that the dirt from the carpet is carried into the sewer and very little, if any, dust is left in the air to be discharged into the atmosphere. The article may be started into the machine and further attendance is unnecessary until it has been discharged therefrom. After it has passed once through the machine if it is sufficiently clean it may be removed from the receiving table 52, or, if necessary, it may be inverted and run through the machine a second time. Thus a thorough cleaning of the article is secured without the necessity of the use of water or other liquid cleansing medium. The machine may be used alone where a dusting operation is sufficient to clean the article, or, it may be used in conjunction with washing machines for dusting the article preparatory to a washing operation.

I claim:

1. In a carpet cleaning machine, a rotary shaft, supporting members secured to said shaft and spaced longitudinally thereof, bars attached to said supporting members and extending parallel with said shaft, flexible beaters looped about said bars and spacers interposed between said beaters, said bars being arranged in longitudinal sets offset angularly about said shaft relative to one another.

2. In a carpet cleaning machine, a rotary shaft, flexible beaters connected to said shaft in spaced relation longitudinally thereof, a support for an article to be cleaned comprising spring slats having fixed ends positioned adjacent said shaft in the path of said beaters, said slats being spaced longitudinally of said shaft to register with said beaters and having free ends extending away from said shaft, and guide bars spaced from said slats to provide a guideway for an article to be cleaned, said guide bars alternating with said slats to permit passage of said beaters between said bars.

3. In a carpet cleaning machine, a guideway for a carpet comprising spring slats supported at one end, guide rods alternating with said slats and spaced therefrom, a feed roller for moving an article between said slats and rods, and beaters for striking said article as it moves over said slats, said rods being extended beyond said slats and curved downwardly at the end of said guideway to direct said article downwardly at the end of said guideway.

4. In a carpet cleaning machine, a guideway comprising spaced substantially parallel slats forming a platform for supporting a carpet, a roller adjacent the ends of said slats, means for rotating said roller to feed a carpet from said roller to said platform and guide bars bridging the space between said roller and platform for directing a carpet from said roller to said platform.

5. In a carpet cleaning machine, a feed roller, guide rods extending from the periphery of said feed roller in approximately tangential direction, supporting slats having free ends projecting between said guide rods to receive a carpet from said guide rods, and beaters arranged to strike said carpet as it moves over said slats.

6. In a carpet cleaning machine, a feed roller having longitudinally spaced contact surfaces thereon, spaced guides extending transversely of said feed roller adjacent the periphery thereof and alternating with said contact surfaces, means for receiving a carpet from said guides, said receiving means having projections extending between said guides, and beaters for striking said carpet to dislodge dirt therefrom.

7. In a carpet cleaning machine, a supporting platform comprising spaced resilient strips, a feed roller for moving a carpet over said strips, a rotary shaft having beaters thereon for striking the carpet above said strips, a casing enclosing said shaft and forming a chamber above said platform, a dust pan forming a chamber below said platform, an exhaust fan, a conduit connected with said exhaust fan, means forming a passage for connecting the chamber below said platform to said conduit, said conduit having a long narrow throat communicating with the chamber above said platform substantially throughout the length of said chamber.

8. In a carpet cleaning machine, an inclined platform, means for feeding a carpet upwardly over said platform, means for beating the carpet as it is fed over said platform, an inclined slideway directed downwardly and backwardly beneath said platform for receiving the carpet from the upper edge of said platform and guides for directing carpets from said platform to said slideway.

9. In a carpet cleaning machine, an upwardly and rearwardly inclined platform, beaters for striking a carpet on said platform and operating to move said carpet upwardly and rearwardly thereover, means for directing the edge of said carpet downwardly over the rear of said platform, and a downwardly and forwardly inclined guide for receiving the carpet from said platform.

10. In a carpet cleaning machine, an upwardly and rearwardly inclined platform, a receptacle at the front of said platform for supporting a carpet to be cleaned, a roller for moving said carpet upwardly and rearwardly over said platform, beaters for striking said carpet as it moves over said platform, said beaters operating to assist in the movement of said carpet over said platform, means for directing the edge of said carpet from the rear edge of said platform downwardly and forwardly, inclined slats for receiving the carpet from said platform, and a receiving table for said carpet at the forward ends of said slats.

11. In a carpet cleaning machine, beating apparatus, a casing providing an elongated chamber enclosing said apparatus, an exhaust pipe extending longitudinally of said chamber, and a wedge-shaped conduit having its wide end communicating with said exhaust pipe and having its narrow end forming a throat communicating with said chamber substantially throughout the length thereof and means for shutting off communication between said conduit and chamber when desired.

In testimony whereof I have signed my name to this specification on this 13th day of August, A. D. 1924.

PASCAL J. SHAMPAY.